US009426005B1

(12) United States Patent
Galanopoulos et al.

(10) Patent No.: US 9,426,005 B1
(45) Date of Patent: Aug. 23, 2016

(54) METHOD FOR INDIRECT MEASUREMENT OF THE PHASE DELAY OF A RF-PWM MODULATOR

(71) Applicant: Infineon Technologies AG, Neubiberg (DE)

(72) Inventors: Kostas Galanopoulos, Villach (AT); David Seebacher, Villach (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 14/795,159

(22) Filed: Jul. 9, 2015

(51) Int. Cl.
*H03K 7/08* (2006.01)
*H04L 25/49* (2006.01)
*H04L 27/20* (2006.01)

(52) U.S. Cl.
CPC ........ *H04L 25/4902* (2013.01); *H04L 27/2053* (2013.01)

(58) Field of Classification Search
CPC .................. H04L 25/4902; H04L 27/2053
See application file for complete search history.

(56) References Cited

U.S. PATENT DOCUMENTS

| | | | | |
|---|---|---|---|---|
| 2003/0058956 | A1* | 3/2003 | Rosnell | H03F 3/217 375/295 |
| 2004/0246060 | A1* | 12/2004 | Varis | H03F 1/02 332/109 |
| 2005/0047480 | A1* | 3/2005 | Carbonari | H04B 1/7174 375/130 |
| 2007/0247239 | A1* | 10/2007 | Maunuksela | H03C 3/40 331/45 |
| 2007/0286273 | A1* | 12/2007 | Clara | H03F 3/217 375/238 |
| 2009/0041108 | A1* | 2/2009 | Degani | H04L 25/4902 375/238 |
| 2009/0149151 | A1* | 6/2009 | Bryant | H03F 3/217 455/341 |

OTHER PUBLICATIONS

Ravi, et al. "A 2.4-GHz 20-40-MHz Channel WLAN Digital Outphasing Transmitter Utilizing a Delay-Based Wideband Phase Modulator in 32-nm CMOS." IEEE Journal of Solid-State Circuits, vol. 47, No. 12, Dec. 2012, pp. 3184-3916.
Nuyts, et al. "A Fully Digital Delay Line Based GHz Range Multimode Transmitter Front-End in 65-nm CMOS." IEEE Journal of Solid State Circuits, vol. 47, No. 7, Jul. 2012, pp. 1681-1692.

\* cited by examiner

*Primary Examiner* — Syed Haider
(74) *Attorney, Agent, or Firm* — Eschweiler & Associates, LLC

(57) ABSTRACT

A delay measurement system to measure a phase delay of a Radio Frequency-Pulse Width Modulated (RF-PWM) signal introduced in a Radio Frequency-Pulse Width Modulator, wherein the RF-PWM signal comprises a sampling frequency and at least one carrier period, and wherein the RF-PWM signal has a symbol in the at least one carrier period. The delay measurement system comprises a first phase modulator circuit configured to generate a first Binary Phase Shifted (BPS) signal having a first period and a second period based upon the RF-PWM signal, wherein the first period of the BPS signal has the symbol therein and the second period of the BPS signal has a 180 degree inverted version of the symbol. The delay measurement system further comprises a second phase modulator circuit configured to generate a second Binary Phase Shifted (BPS) signal having a first period and a second period, wherein the first period of the BPS signal has the symbol therein and the second period of the BPS signal has a 180 degree inverted version of the symbol. Further, the delay measurement system comprises a detector circuit configured to determine the phase delay of the RF-PWM signal based on the first BPS signal or the second BPS signal and output the phase delay.

20 Claims, 7 Drawing Sheets

METHOD FOR INDIRECT MEASUREMENT OF THE PHASE DELAY OF A RF-PWM MODULATOR

FIELD

The present disclosure relates to a phase delay measurement system and method to measure a phase delay in a communication system.

BACKGROUND

Digital Radio Frequency-Pulse Width Modulation (RF-PWM) modulators are used to perform direct digital up-conversion from baseband to Radio Frequency (RF). The output signal remains purely binary. The non-ideal digital and analog effects of the RF-PWM modulators may affect the quality of the output leading to erroneous results. Therefore, it is required to compensate for the non-ideal digital and analog effects. In order to compensate for these effects, it may be required to know the exact phase delay of the output signal with respect to the sampling timing.

DETAILED DESCRIPTION

Figure 1:
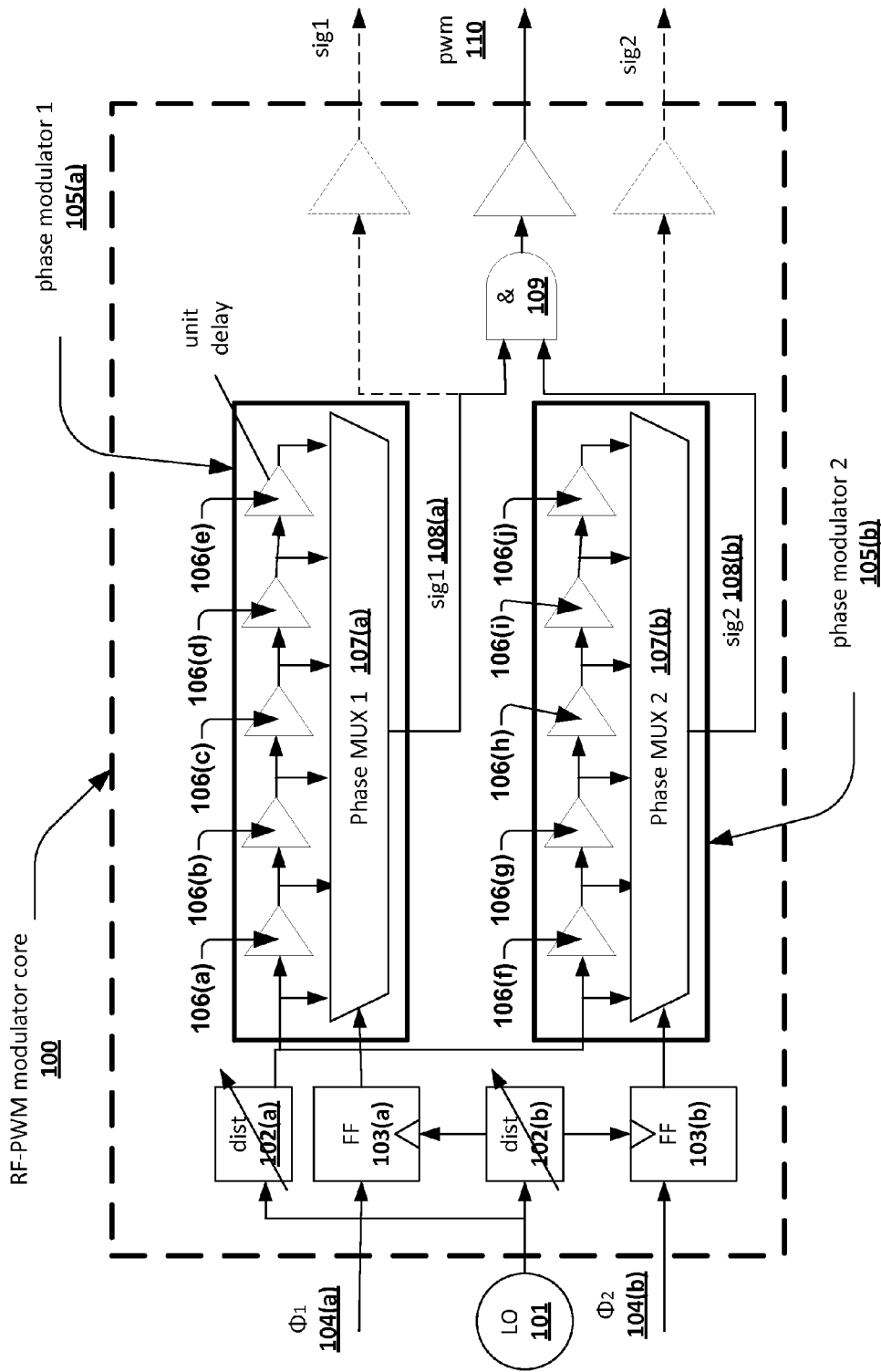
FIG. 1 illustrates an implementation of a RF-PWM modulator core.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," "decoder" and the like are intended to refer to a computer-related entity, hardware, software (e.g., in execution), or firmware. For example, a component can be a processor, a process running on a processor, an object, an executable, a program, a storage device, an electronic circuit or a computer with a processing device. By way of illustration, an application running on a server and the server can also be a component. One or more components can reside within a process, and a component can be localized on one computer and/or distributed between two or more computers.

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Direct RF-PWM modulators are used for direct digital up-conversion from base band to RF. In RF-PWM modulation, the amplitude modulation is encoded by the pulse length determined by the RF-PWM modulator and the phase is encoded by the pulse position to obtain a RF-PWM signal. However, for proper operation of the RF-PWM modulation, the non-ideal digital and analog effects of the RF-PWM modulator have to be compensated for.

FIG. 1 illustrates an implementation of a RF-PWM modulator core 100. The Local Oscillator (LO) signal 101 is fed to the distribution units 102(a) and 102(b). Flip Flops 103(a) and 103(b) are supplied with two phases (base band digital inputs) 104(a) and 104(b) respectively. The Flip Flops 103(a) and 103(b) are connected to Phase Modulator 1 (PM1) 105(a) and Phase Modulator 2 (PM2) 105(b) respectively. The PM1 105(a) comprises a series of unit delay components 106(a)-106(e) and a Phase Multiplexer 1 107(a). The PM2 105(b) comprises a series of unit delay components 106(f)-106(j) and a Phase Multiplexer 2 107(b). The output sig1 108(a) of the PM1 107(a) and the output sig2 108(b) of the PM2 107(b) are logically ANDed using the AND gate 109 to obtain a RF-PWM signal 110, which is the output of the RF-PWM modulator core.

The LO signal 101 is fed to the two phase modulators 105(a) and 105(b) through the distribution network 102(a) which has a certain delay. The distribution network 102(b) provides clock signals for the Flip Flops 103(a) and 103(b) that generate the control signals of Phase Multiplexer 1 107(a) and Phase Multiplexer 2 107(b) and thus the timing for when the output signal sig1 108(a) and sig2 108(b) are output from the phase multiplexers 107(a) and 107(b) respectively.

The desired RF-PWM signal 110 is generated by shifting the output of the two phase modulators 105(a) and 105(b) and logically ANDing the two shifted signals. The RF-PWM modulator core 100 directly converts digital baseband signal to an RF signal which in this embodiment is a single bit output signal. The output signals sig1 108(a) and sig2 108(b) of the two phase modulators 105(a) and 105(b) respectively, may be available off-chip for calibration purposes.

The LO distribution units 102(a) and 102(b) add an unknown delay. Further, the Flip Flops 103(a) and 103(b) typically have an additive unknown delay between the rising edge of the clock signal and their output. These factors lead to an unknown "phase delay" between the first tap of the phase modulators and the control signals of the phase multiplexers. Further, the phase multiplexers 107(a) and 107(b) that select the output signals 108(a) and 108(b) of the phase modulators 105(a) and 105(b), by combining the output of the Flip Flops 103(a) and 103(b) respectively with a set of taps of the LO signal 101, may not have an equal propagation delay for its Data and Select inputs.

In order to correct the purely digital effects and other nonlinear effects in the RF-PWM modulator, such as Cross Point Estimation (CPE), where the rising and falling edges are corrected with respect to their position within one sampling (carrier) period requires to know the exact "phase delay" of the output signals 108(a), 108(b) with respect to the sampling timing (clock input to the Flip Flops). However, it is not possible to calculate the "phase delay" in the system using direct measurement techniques as there are no access points to tap the required metrics from. The internal sampling clock and the output of the phase modulators are internal nodes and accurate measurement of the "phase delay" using additional circuitry would require a tightly (delay) matched access to the internal nodes. This leads to additional design effort as well as power consumption.

The present disclosure describes an indirect method of determining the "phase delay" in the system. For illustrative purposes, zero delay operation of the Flip Flops and the phase multiplexers is assumed. However, the techniques appreciated below to determine the "phase delay" also compensates the non-ideal scenarios present in the real behavior of the circuit.

Figure 2:
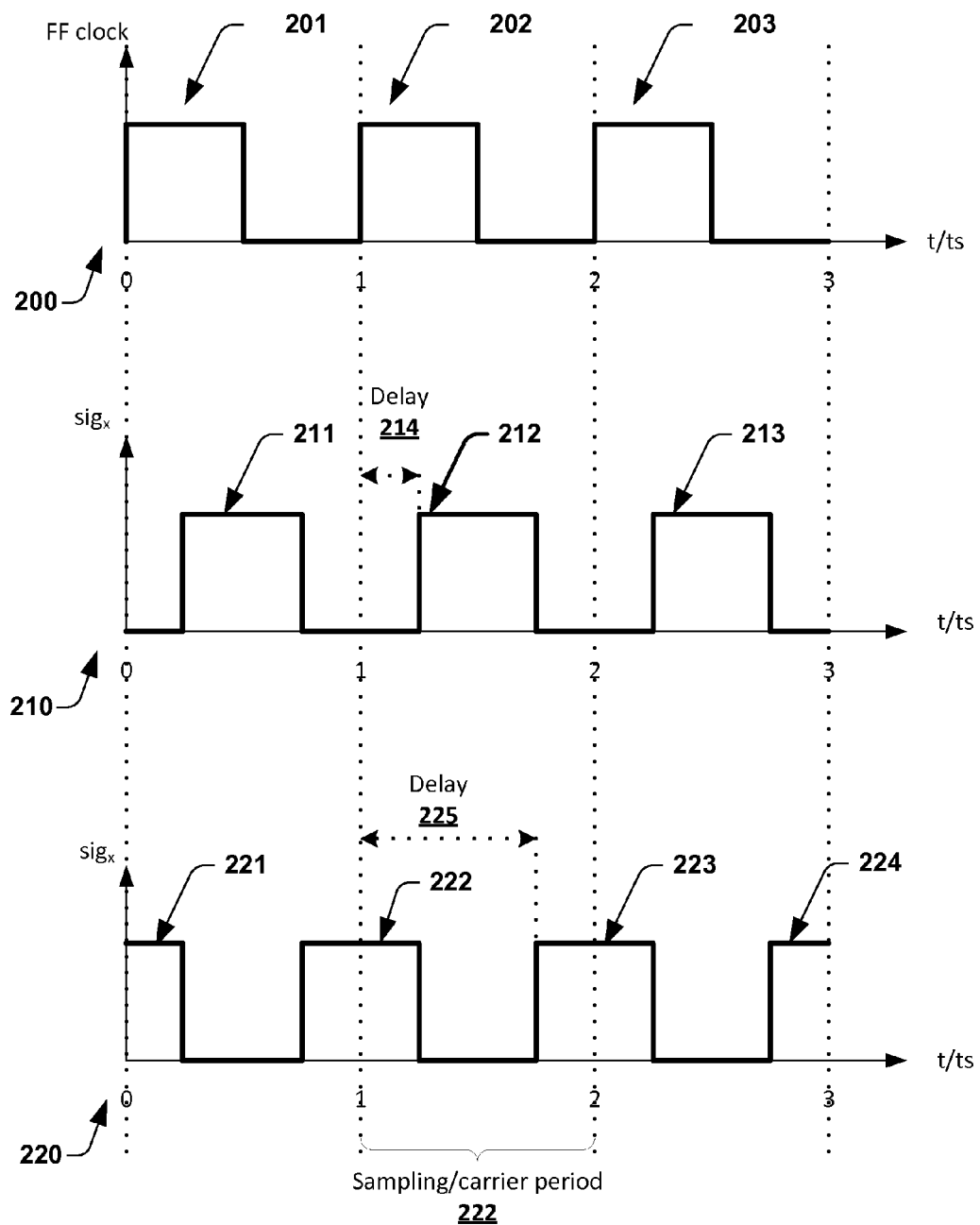
FIG. 2 illustrates an example of the timing diagrams for the measurement problems.

FIG. 2 illustrates an example of the timing diagrams for the measurement problems. The sampling clock signal for the Flip Flops is shown by the element 200 of FIG. 2. Element 200 depicts the sample timing of the Flip Flops from the distribution unit 102(b) in FIG. 1. Elements 210 and 220 show the exemplary outputs of one of the phase modulators 105(a) or 105(b) and the delay value of interest. The elements 0, 1, 2 and 3 represent the carrier period with respect to the clock signal 200.

Element 200 shows an ideal case of the clock signal wherein each pulse belongs to only one carrier period. The pulse 201 falls within the carrier period 0-1, the pulse 202 falls within the carrier period 1-2 and the pulse 203 falls within the carrier period 2-3. Elements 210 and 220 show the signal of the first tap 106(a) or 106(f) of one of the two phase modulators 105(a) or 105(b) respectively, in case of a delay in the distribution circuits 102(a) and 102(b), respectively. In the waveform represented by element 210, the pulse 211 falls in two carrier periods 0-1 and 1-2. Similarly, the pulse 212 falls in two carrier periods 1-2 and 2-3. The "phase delay" of signal 210 is represented by the element 214. Similarly, in the waveform represented by element 220, the pulse 222 falls in two carrier periods 0-1 and 1-2, and the pulse 223 falls in two carrier periods 2-3. The phase delay 225 in the case of element 220 is higher when compared to the phase delay 214 in the case of element 210.

The direct measurement of this "phase delay" introduced by different components of the RF-PWM core can be calculated only if there is access to terminals of the components. However, it is not possible to tap the terminals of the components of interest. An indirect method of calculating the "phase delay" is disclosed.

A delay measurement system is disclosed. The delay measurement system measures a phase delay of a Radio Frequency-Pulse Width Modulated (RF-PWM) signal introduced in a Radio Frequency-Pulse Width Modulator. The RF-PWM signal comprises at least one carrier period and the RF-PWM signal has a symbol in the at least one carrier period.

Figure 3:
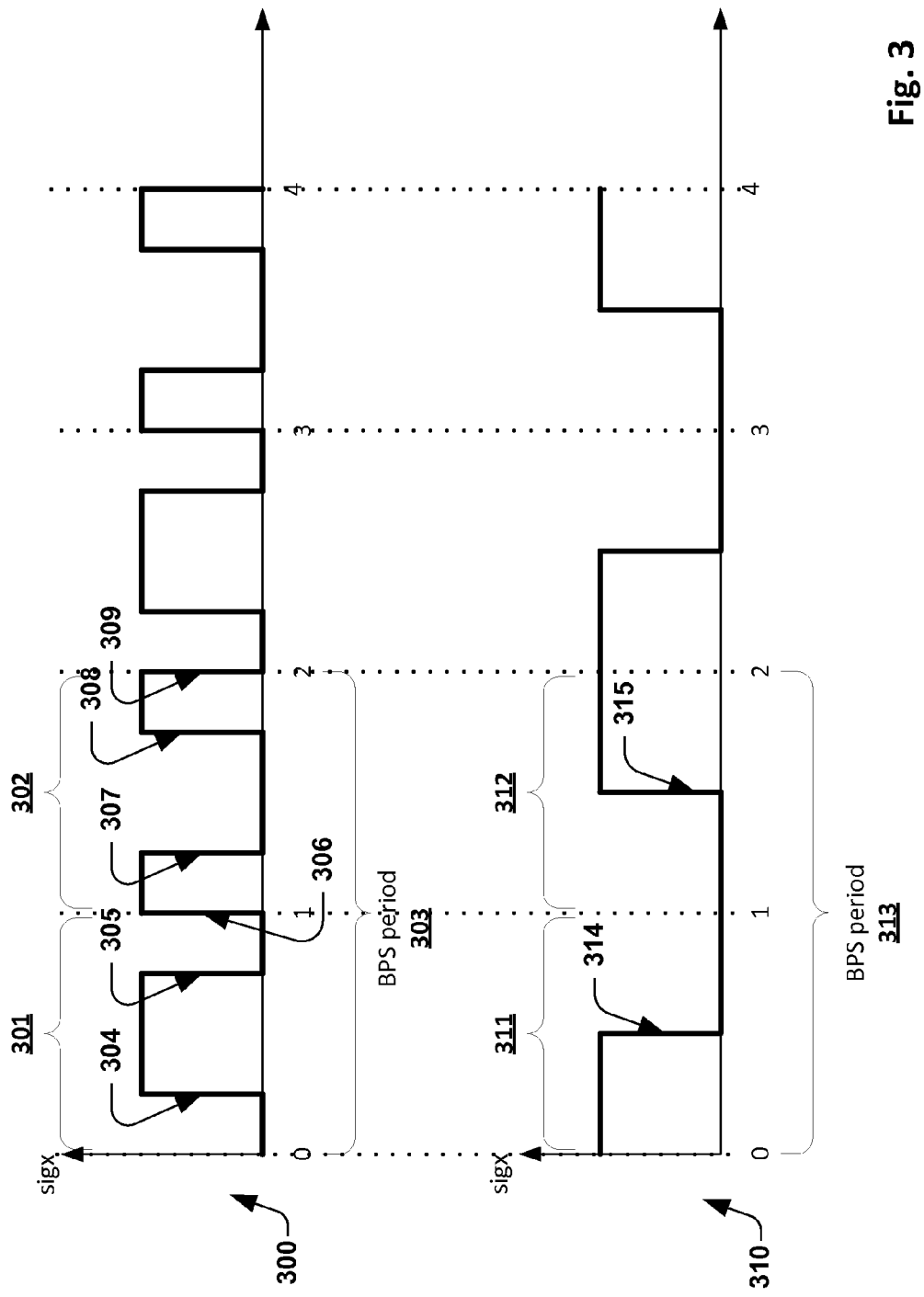
FIG. 3 illustrates the generation of BPS signals.

FIG. 3 illustrates the generation of the BPS signal. Reference numeral 300 shows the BPS signal generated when there is "phase delay" in the RF-PWM signal generated by the RF-PWM modulator. Element 300 is the BPS signal generated by the RF-PWM modulator in accordance with the element 210 of FIG. 2, in which the phase delay is 214. The delay measurement system generates the input signals for the RF-PWM modulator to provide the BPS signal 300. The symbol 211 in the first carrier period 0-1 of the signal 210 is the symbol 301 in the first carrier period of the BPS signal 300. The symbol 302 in the second carrier period 1-2 of the BPS signal 300 is a 180 degree phase shifted (e.g., inverted) version of the symbol 301. The period 0-2 in the signal 300 is called a BPS period 303. The BPS period 303 of the BPS signal 300 comprises two samples 301 and 302.

Similarly, element 310 is the BPS signal generated in accordance with the element 200 of FIG. 2, in which there is no phase delay between the LO signal and the selected (phase shifted) output of the phase modulators. The RF-PWM modulator generates the BPS signal 310 based on signal 200. The symbol 201 in the first carrier period 0-1 of the signal 200 is the symbol 311 in the first carrier period of the BPS signal 310. The symbol 312 in the second carrier period 1-2 of the BPS signal 310 is a 180 degree phase shifted (e.g., inverted) version of the symbol 311. The period 0-2 in the signal 310 is called a BPS period 313. The BPS period 313 of the BPS signal 310 comprises two samples 311 and 312.

A BPS signal generated when there is "phase delay", has more than two signal transitions within a BPS period. For example, the BPS signal 300, generated in accordance with the element 210 of FIG. 2 with the phase delay 214, has six signal transitions in the BPS period 303 represented by the elements 304-309. In other words, a BPS signal generated when the "phase delay" is greater than 0, has more than two edges (rising edges and falling edges) in one BPS period. In contrast, a BPS signal generated when there is no "phase delay" between the modulator output and the sampling timing has only two signal transitions or two edges. For example, the BPS signal 310, generated in accordance with the element 200 of FIG. 2 with no phase delay, has only two signal transitions in the BPS period 313 represented by the elements 314 and 315. The further embodiments appreciate the estimation of the phase delay.

Figure 4A:
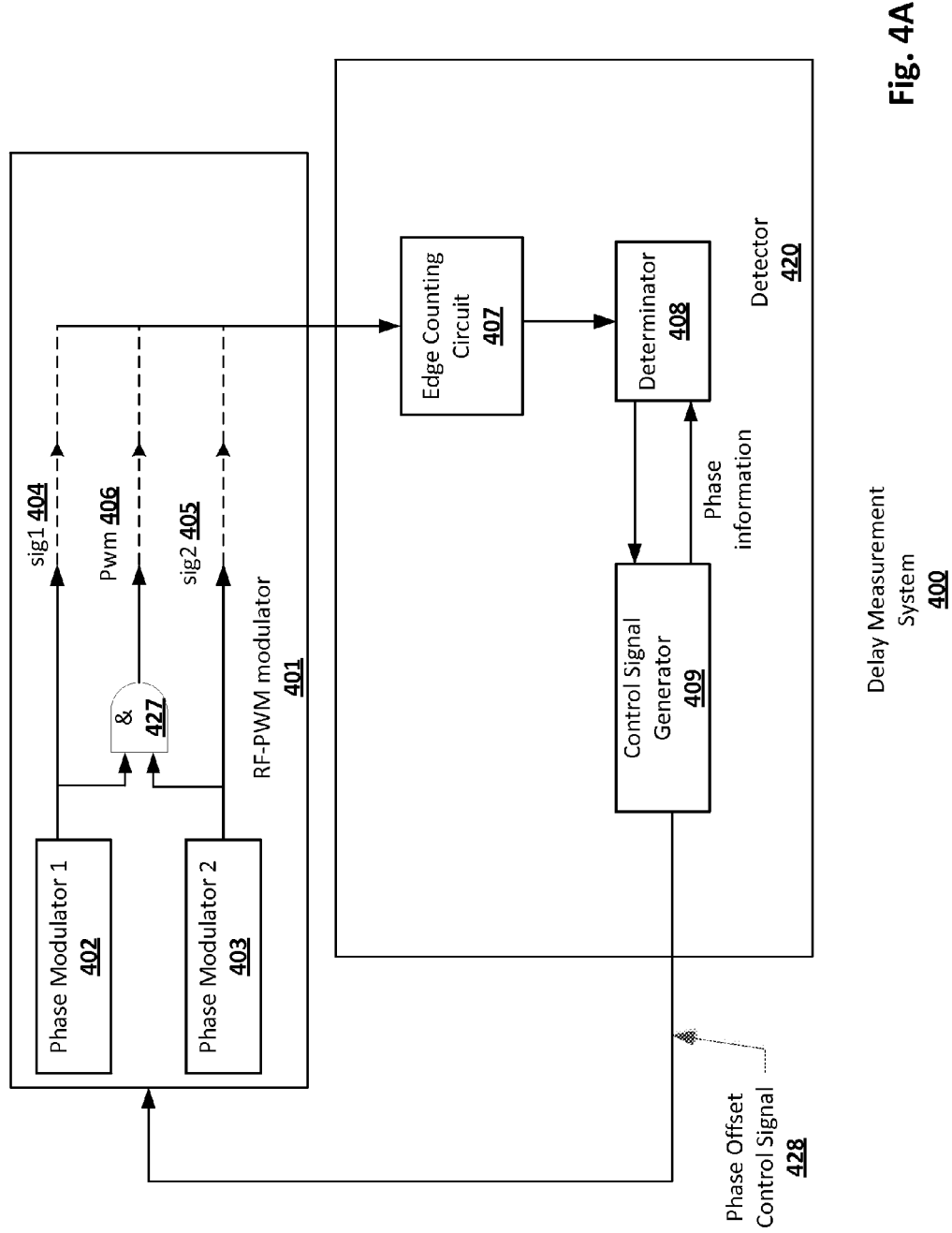
FIG. 4A illustrates an embodiment of the delay measurement system which comprises an edge counting circuit.

FIG. 4A illustrates an embodiment of a delay measurement system. The delay measurement system 400 comprises a RF-PWM modulator 401, two phase modulators 402-403 and a detector circuit 420. The detector circuit 420 further comprises an edge counting circuit 407, a determinator 408 and a control signal generator 409. The phase modulators 402 and 403 are configured to generate a first BPS signal 404 and a second BPS signal 405 respectively. Both the BPS signals 404 and 405 have a first period and a second period based upon the RF-PWM signal. The first period of the BPS signals has a symbol therein and the second period of the BPS signals has a 180 degree inverted version of the symbol. The BPS signals 404-405 from the phase modulators 402-403 is logically ANDed 407 to obtain a new BPS signal 406. The generation of the BPS signal is illustrated below.

The edge counting circuit 407 is configured to receive any one of the BPS signals 404-406 and count the edges of the respective BPS signal in a time frame defined by the first period and the second period. The edge counting circuit 407 generates a count of a rising edge or a falling edge, or both the rising edges and the falling edges of the BPS signal. The determinator 408 checks if the count generated by the edge counting circuit 407 is equal to two. If the count generated by the edge counting circuit 407 is not two, then the determinator circuit 408 sends a request to the control signal generator 409. The control signal generator 409 is configured to generate a phase offset control signal 428. The phase offset control signal 428 offsets a phase of the first phase modulator 402 and the second phase modulator 403. The phase modulators 402-403 now generate new BPS signals 404 and 405 respectively which are phase shifted, wherein the phase shift is defined by the phase offset control signal 428 from the control signal generator 409. The newly generated BPS signal 404-406 is fed to the edge counting circuit 407. This process continues as long as the count the count generated by the edge counting circuit is not equal to two. If the count generated by the edge counting circuit is two, the phase offset control signal 409 is configured to provide feedback information to the determinator circuit 408. The determinator circuit 408 determines the phase delay based on the feedback information received.

In some embodiments, the determinator 408 checks if the count generated by the edge counting circuit is one, since the edge counting circuit 407 is configured to generate an edge count of only the rising edges or only the falling edges. For simplicity, the remainder of the description appreciates the edge counting circuit to generate an edge count of both the rising edges and the falling edges of the BPS signal.

Figure 4B:
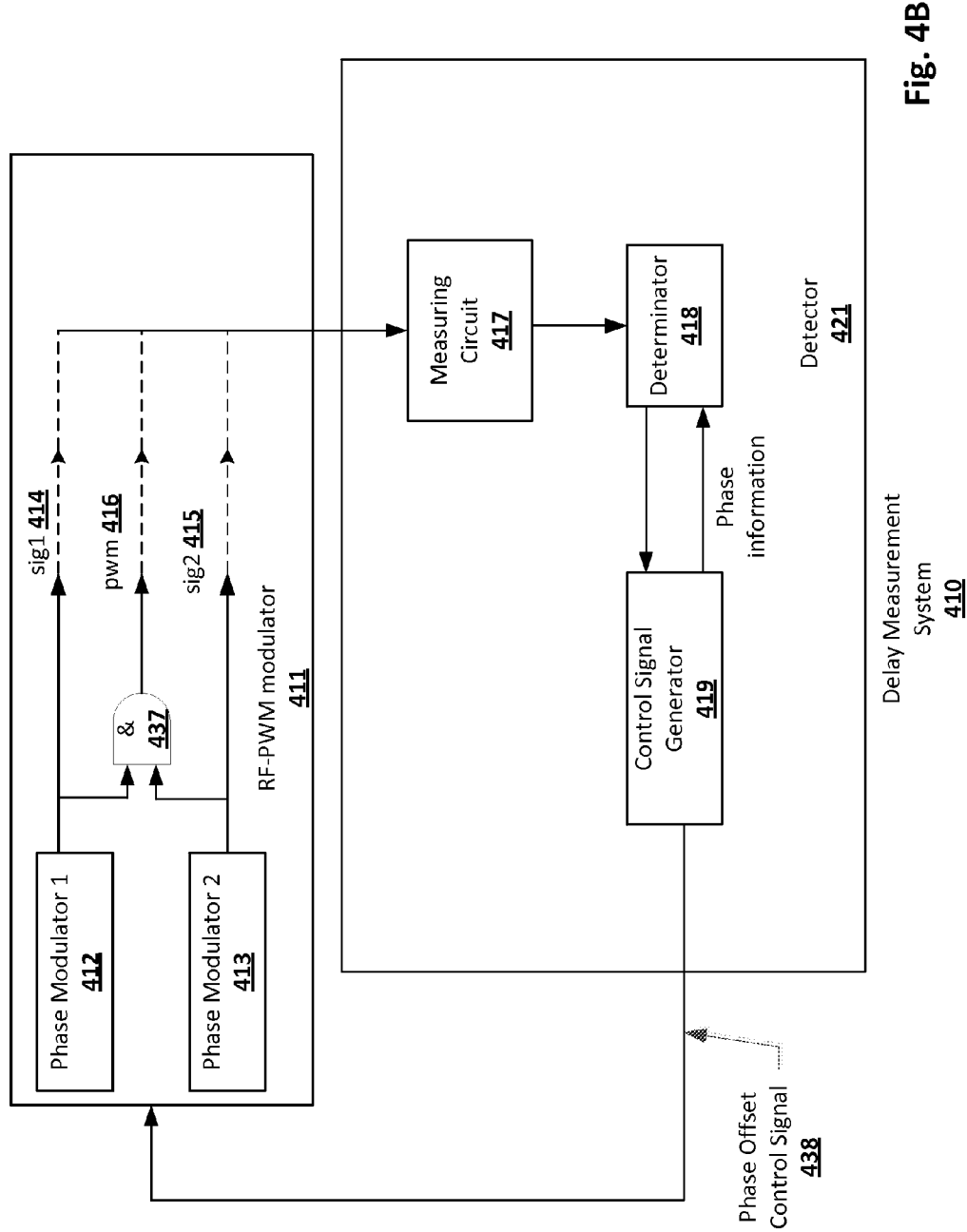
FIG. 4B illustrates an embodiment of the delay measurement system which comprises a measuring circuit.

FIG. 4B illustrates an embodiment of a delay measurement system. The delay measurement system 410 comprises a RF-PWM modulator 411, two phase modulators 412-413 and a detector circuit 421. The detector circuit further comprises a measuring circuit 417, a determinator 418 and a control signal generator 419. The phase modulators 412 and 413 are configured to generate a first BPS signal 414 and a second BPS signal 415 respectively. Both the BPS signals 414 and 415 have a first period and a second period based upon the RF-PWM signal. The first period of the BPS signals has a symbol therein and the second period of the BPS signals has a 180 degree inverted version of the symbol. The BPS signals 414-415 from the phase modulators 412-413 is logically ANDed 437 to obtain a new BPS signal 416. The generation of the BPS signal is appreciated above with reference to FIG. 3.

The measuring circuit 417 is configured to receive any one of the BPS signals 414-416 and measure a metric of the BPS signal in a time frame defined by the first period and the second period. The measuring circuit 417 can be an oscilloscope, a spectrum analyzer, a signal analyzer, a network analyzer, a multimeter, a voltmeter or an internal analysis circuit of the delay measurement system. The determinator circuit 418 checks if the metric measured by the measuring circuit 417 reaches a predetermined metric value. If the metric measured by the measuring circuit 417 does not reach the predetermined metric value, the determinator circuit 418 sends a request to the control signal generator 419. The control signal generator 419 is configured to generate a phase offset control signal 438. The phase offset control signal 438 offsets a phase of the first phase modulator 412 and the second phase modulator 413. The phase modulators 412-413 now generate new BPS signals 414 and 415 respectively which are phase shifted, wherein the phase shift is defined by the phase offset control signal 438 from the control signal generator 419. The newly generated BPS signals 414 and 415 are fed to the measuring circuit 417. This process continues as long as the metric measured by the measuring circuit 417 is not equal to the predetermined metric value. If the metric measured by the measuring circuit 417 is equal to the predetermined metric value, the phase shifter is configured to provide feedback information to the determinator circuit 418. The determinator circuit 418 determines the phase delay based on the feedback information received.

The resolution of phase shift by the control signal generator 409 or 419 may vary based on the requirement. The control signal generator 409 or 419 may also have an initial phase shift setting wherein the phase of the BPS signal is shifted by a predetermined reference phase. In this case, the measurement of the phase delay by the delay measurement system is done with respect to the predetermined reference phase. Further, the measurement of the phase delay in the system can be done by using either the output signals from the two phase modulators 108(a) or 108(b) or the output signal from the RF-PWM modulator 110. Further, the edge count remains the same if the BPS signal is shifted by 180 degrees, as the first and the second symbol of the BPS signal are interchanged every 180 degrees.

In one embodiment, the measuring circuit measures the amplitude of the BPS signal at half the carrier (LO) frequency. The control signal generator sweeps the phase with the desired resolution. A fine resolution of the phase shift gives an accurate detection of the phase delay. However, if the resolution is not fine, then the detection of the phase delay is approximated by interpolation or any other known approximation techniques. The determinator circuit determines the phase at which the power of the BPS signal is maximum and calculates the phase delay present in the system.

Figure 5:
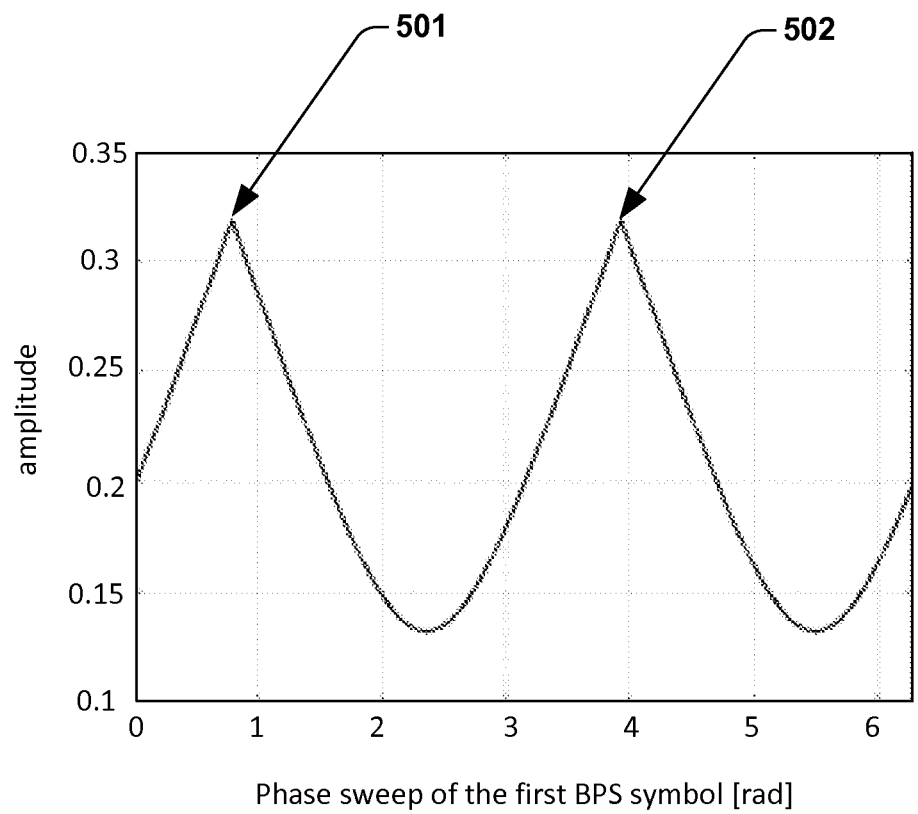
FIG. 5 illustrates an example of metric measurement in a delay measurement system.

FIG. 5 illustrates an example of the phase delay detection by the measuring circuit of a RF-PWM modulator which introduces a phase delay of 45 degrees. In accordance with FIG. 5, the measuring circuit is configured to measure the amplitude of the BPS signal at half the carrier frequency. The phase of the BPS signal is varied by the phase shifter and the amplitude at each phase is measured. In accordance with the example in FIG. 5, the amplitude response has clear maxima indicating the phase delay. The first maximum 501 is at a phase setting of 0.78 radians which is approximately 45 degrees. The second maximum 502 is at a phase setting of 3.926 radians which is approximately 225 degrees. As appreciated earlier, a correct selection of the metric measured within 180 degrees is required as the first and the second symbol of the BPS signal are interchanged every 180 degrees. In accordance with FIG. 5, for a RF-PWM modulator with an overall phase delay of 45 degrees, a maximum of the amplitude response of the BPS signal at half the carrier frequency also appears at 45 degrees, thus rendering a good detection of the phase delay.

The accuracy of the phase delay measured by the delay measurement system of FIG. 4B can be enhanced by fitting the theoretical amplitude response to the measured amplitude response.

$$A = \frac{A_o}{\pi}\sqrt{3 - 2\cos\frac{\mod(\phi_{init} + \phi_{delay}, \pi)}{2} - 2\sin\frac{\mod(\phi_{init} + \phi_{delay}, \pi)}{2}}$$

$A_o$ denotes the amplitude of the pulses, $\phi_{init}$ denotes the phase of the BPS signal and $\phi_{delay}$ denotes the delay value of interest. By fitting the amplitude parameter $A_o$ and the phase delay $\phi_{delay}$ for all the measured phases of the BPS signal $\phi_{init}$, the accuracy of the delay measurement can be enhanced.

Figure 6:
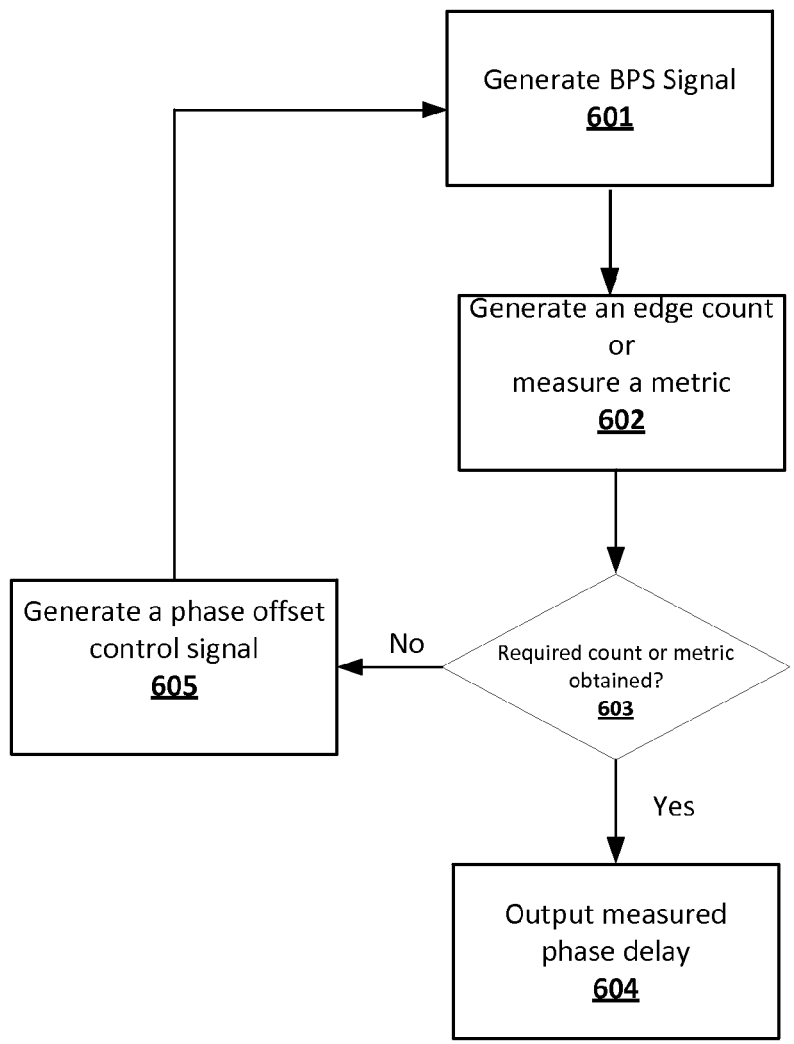
FIG. 6 illustrates a flow diagram of a method for correcting the phase delay introduced by the RF-PWM modulator.

A method to measure a phase delay of a RF-PWM signal generated by a RF-PWM modulator is disclosed. The RF-PWM signal from the RF-PWM modulator comprises at least one carrier period and has a symbol in the at least one carrier period. FIG. 6 illustrates a flow diagram of the measurement of a phase delay generated by a RF-PWM modulator circuit. Act 601 illustrates generating a Binary Phase Shifter (BPS) signal having a first period and a second period based upon the RF-PWM signal; the first period of the BPS signal has the symbol therein and the second period of the BPS signal has a 180 degree inverted version of the symbol. Act 602 either generates a count of the edges of the phase shifted BPS signal, or measures a metric of the phase shifted BPS signal, or both generates a count of the edges and measures a metric of the phase shifted BPS signal, in a time frame defined by the first and the second period. Act 603 checks if the count generated or the metric measured is equal to the predetermined count value or the predetermined metric value, respectively. If they are not equal, then the phase shifted BPS signal is further phase shifted by act 605 to generate a new phase shifted BPS signal. The acts 601-604 continue till the generated count or the metric measured reach the predetermined count value or the predetermined metric value, respectively. The phase delay of the system is then measured and output in act 605.

Although the disclosure has been illustrated and described with respect to one or more implementations, alterations and/or modifications may be made to the illustrated examples without departing from the spirit and scope of the appended claims.

Moreover, in particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A delay measurement system to measure a phase delay of a Radio Frequency-Pulse Width Modulated (RF-PWM) signal introduced in a Radio Frequency Pulse Width Modulator, wherein the RF-PWM signal comprises a sampling frequency and at least one carrier period, and wherein the RF-PWM signal has a symbol in the at least one carrier period, the delay measurement system comprising:
   a first phase modulator circuit configured to generate a first Binary Phase Shifted (BPS) signal having a first period and a second period based upon the RF-PWM signal, wherein the first period of the BPS signal has the symbol therein and the second period of the BPS signal has a 180 degree inverted version of the symbol;
   a second phase modulator circuit configured to generate a second Binary Phase Shifted (BPS) signal having a first period and a second period, wherein the first period of the BPS signal has the symbol therein and the second period of the BPS signal has a 180 degree inverted version of the symbol; and
   a detector circuit configured to determine the phase delay of the RF-PWM signal based on the first BPS signal or the second BPS signal and output the phase delay.

2. The delay measurement system of claim 1,
   wherein the detector circuit comprises an edge counting circuit configured to receive the first BPS signal or the second BPS signal and generate an edge count of the first BPS signal or the second BPS signal in a time frame defined by the first period and the second period.

3. The delay measurement system of claim 2,
   wherein the edge counting circuit is configured to generate the edge count of one or more rising edges, or one or more falling edges, or both the rising edges and the falling edges of the first BPS signal or the second BPS signal.

4. The delay measurement system of claim 2,
   wherein the detector circuit comprises a determinator circuit configured to determine and output the phase delay based on the edge count generated by the edge counting circuit.

5. The delay measurement system of claim 1,
   wherein the detector circuit further comprises a measuring circuit configured to measure a metric of the first BPS signal or the second BPS signal in a time frame defined by the first period and the second period.

6. The delay measurement system of claim 5,
   wherein the detector circuit further comprises a determinator circuit configured to determine and output the phase delay based on the metric measured by the measuring circuit.

7. The delay measurement system of claim 5,
   wherein the metric measured by the measuring circuit is an amplitude of the first BPS signal or the second BPS signal at half an output frequency of a Local Oscillator circuit associated with the first phase modulator circuit and the second phase modulator circuit.

8. The delay measurement system of claim 5,
   wherein the measuring circuit is an oscilloscope, a spectrum analyzer, a signal analyzer, a network analyzer, a multimeter, a wattmeter, a voltmeter or an internal analysis circuit of the delay measurement system.

9. The delay measurement system of claim 1,
   wherein the detector circuit further comprises a control signal generator configured to generate a phase offset control signal, wherein the phase offset control signal offsets a phase of the first phase modulator and the second phase modulator.

10. A method to measure a phase delay of a Radio Frequency-Pulse Width Modulated (RF-PWM) signal introduced by a Radio Frequency-Pulse Width Modulator, wherein the RF-PWM signal comprises a sampling frequency and at least one carrier period, and wherein the RF-PWM signal has a symbol in the at least one career period, the method comprising:
    generating, by a first phase modulator circuit, a first Binary Phase Shifted (BPS) signal having a first period and a second period based upon the RF-PWM signal, wherein the first period of the BPS signal has the symbol therein and the second period of the BPS signal has a 180 degree inverted version of the symbol;
    generating, by a second phase modulator circuit, a second Binary Phase Shifted (BPS) signal having a first period and a second period based upon the RF-PWM signal, wherein the first period of the BPS signal has the symbol therein and the second period of the BPS signal has a 180 degree inverted version of the symbol; and
    determining, by a detector circuit, the phase delay of the RF-PWM signal based on the first signal or the second BPS signal and output the phase delay.

11. The method of claim 10, further comprising:
    generating, by an edge counting circuit, an edge count of the first BPS signal or the second BPS signal in a time frame defined by the first period and the second period.

12. The method of claim 11, further comprising:
    generating an edge count of one or more rising edges, or one or more falling edges, or both the rising edges and the falling edges of the first BPS signal or the second BPS signal.

13. The method of claim 11, further comprising:
    determining, by a determinator circuit, the phase delay based on the edge count generated by the edge counting circuit.

14. The method of claim 10, further comprising:
measuring, by a measuring circuit, a metric of the first BPS signal or the second BPS signal in a time frame defined by the first period and the second period.

15. The method of claim 14, further comprising:
determining, by a determinator circuit, the phase delay based on the metric measured by the measuring circuit.

16. The method of claim 14,
wherein the metric measured is an amplitude of the first BPS signal or the second BPS signal at half an output frequency of a Local Oscillator circuit associated with the first phase modulator circuit and the second phase modulator circuit.

17. The method of claim 10, further comprising:
generating, by a control signal generator, a phase offset control signal, wherein the phase offset control signal offsets a phase of the first phase modulator and the second phase modulator.

18. An estimator circuit to estimate a phase delay in a RF-PWM modulator, wherein the RF-PWM modulator generates a BPS signal, and wherein the BPS signal comprises a first period and a second period, wherein the first period has a symbol therein and the second period has a 180 degree inverted version of the symbol, the estimator circuit comprising:
a detector circuit configured to receive the BPS signal and determine the phase delay in the BPS signal; and
a control signal generator configured to generate a phase offset control signal, wherein the phase offset control signal offsets a phase of the RF-PWM modulator.

19. The estimator circuit of claim 18,
wherein the detector circuit comprises an edge counting circuit configured to generate an edge count of the BPS signal in a time frame defined by the first period and the second period.

20. The estimator circuit of claim 18,
wherein the detector circuit comprises a measuring circuit configured to measure a metric of the BPS signal in a time frame defined by the first period and the second period.

* * * * *